(12) United States Patent
Biernat et al.

(10) Patent No.: US 11,125,282 B2
(45) Date of Patent: Sep. 21, 2021

(54) TORQUE LIMITER ASSEMBLY

(71) Applicant: Hamilton Sundstrand Corporation, Charlotte, NC (US)

(72) Inventors: Marcin Biernat, Wroclaw (PL); Kamil Babicki, Wysoka (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 292 days.

(21) Appl. No.: 16/029,703

(22) Filed: Jul. 9, 2018

(65) Prior Publication Data
US 2019/0010997 A1 Jan. 10, 2019

(30) Foreign Application Priority Data

Jul. 8, 2017 (EP) .................................... 17461564

(51) Int. Cl.
*F16D 43/208* (2006.01)
*F16D 7/10* (2006.01)

(52) U.S. Cl.
CPC ............. *F16D 43/208* (2013.01); *F16D 7/10* (2013.01)

(58) Field of Classification Search
CPC ....... F16D 7/10; F16D 43/204; F16D 43/2008
USPC ............................. 464/35, 37; 192/55.1, 56.1
See application file for complete search history.

(56) References Cited

U.S. PATENT DOCUMENTS

| 1,953,430 | A | * | 4/1934 | Parre | F16D 7/048 |
| | | | | | 464/37 |
| 3,593,542 | A | | 7/1971 | Urayama | |
| 6,247,570 | B1 | | 6/2001 | Zindler | |
| 8,251,826 | B2 | * | 8/2012 | Lai | F16D 7/048 |
| | | | | | 192/56.1 |
| 2012/0234642 | A1 | * | 9/2012 | Sekine | F16F 15/1297 |
| | | | | | 192/55.1 |
| 2015/0240881 | A1 | | 8/2015 | Bibby | |

FOREIGN PATENT DOCUMENTS

| EP | 1146240 A2 | 10/2001 | |
| GB | 2321089 A | * 7/1998 | ............. F16D 7/048 |

OTHER PUBLICATIONS

Extended European Search Report for International Application No. 17461564.1 dated Mar. 2, 2018, 7 pages.

* cited by examiner

*Primary Examiner* — Richard M Lorence
(74) *Attorney, Agent, or Firm* — Cantor Colburn LLP

(57) ABSTRACT

A torque limiting assembly is disclosed comprising: an input shaft; an output shaft; and spring having a first end coupled to the input shaft and a second end coupled with the output shaft. In a low torque mode, when the input shaft is rotated the spring is compressed by a low amount and transmits a force to drive rotation of the output shaft, whereas in a high torque mode the spring is compressed by a high amount such that the input shaft rotates relative to the output shaft. This relative rotation moves or urges an engagement member so as to either: disconnect the input shaft from the output shaft; or engage a housing to prevent or inhibit rotation of the input shaft relative to the housing.

10 Claims, 9 Drawing Sheets

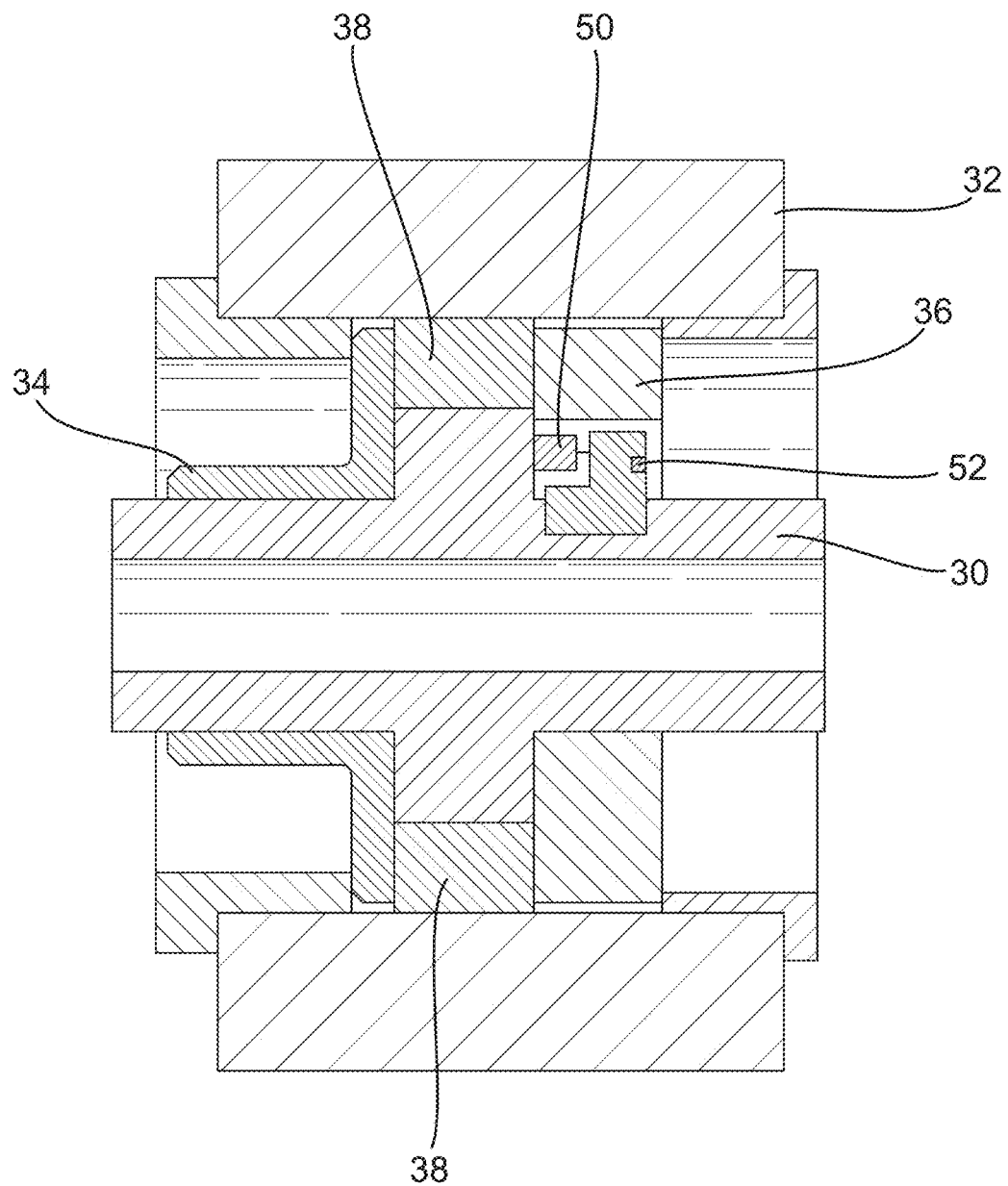

TORQUE LIMITER ASSEMBLY

FOREIGN PRIORITY

This application claims priority to European Patent Application No. 17461564.1 filed Jul. 8, 2017, the entire contents of which is incorporated herein by reference.

FIELD

The present disclosure relates generally to assemblies for limiting the amount of torque in a system where an input shaft drives an output shaft.

BACKGROUND

An overload clutch is a known type of device that mechanically decouples a rotatable input drive shaft from a rotatable output driven shaft if the torque in the system becomes too high due to mechanical overloading. This is used to protect mechanical equipment from damage caused by excessive torque.

Other types of torque limiting assemblies are also known in which the input shaft is prevented from rotating if the torque in the system becomes excessive.

SUMMARY

The present disclosure provides a torque limiting assembly comprising: an input shaft; an output shaft; and a first resilient biasing member having a first portion coupled to the input shaft and a second portion coupled with the output shaft. The assembly is configured such that, in a low torque mode, when the input shaft is rotated in a first direction the first resilient biasing member is compressed by a relatively low amount and transmits a force from rotation of the input shaft to drive rotation of the output shaft. The assembly is also configured such that, in a high torque mode, when the input shaft is rotated in the first direction the first resilient biasing member is compressed by a relatively high amount such that the input shaft rotates relative to the output shaft, thereby moving or urging an engagement member so as to either: i) disconnect the input shaft from the output shaft; or ii) engage a housing to prevent or inhibit rotation of the input shaft relative to the housing.

The first resilient biasing member may be selected so as to select the level of torque at which the assembly switches between the low torque mode and the high torque mode. For example, in embodiments where the resilient biasing member is a spring, the level of torque at which the assembly switches between the two modes may be set by selecting a spring with a desired spring stiffness.

The first and second portions of the resilient biasing member may be the first and second ends of the resilient biasing member, respectively.

The torque assembly comprises said engagement member.

The torque assembly may comprise said housing.

The first portion of the first resilient biasing member may be directly connected with the input shaft. The second portion of the first resilient biasing member may be directly or indirectly coupled/connected with the output shaft.

In the low torque mode, the first resilient biasing member is compressed by a relatively low amount such that the input shaft does not rotate, or rotates a relatively low amount, relative to the output shaft. In contrast, in the high torque mode, the first resilient biasing member is compressed by a relatively high amount such that the input shaft rotates, or rotates a relatively large amount, relative to the output shaft.

In use, the input shaft is driven to rotate, e.g. by a motor. It will be appreciated that the low torque mode occurs when there is relatively low resistance to rotation of the output shaft and the high torque mode occurs when there is relatively high resistance to rotation of the output shaft. Therefore, the first resilient biasing member is configured to be compressed a relatively low amount (e.g. not at all) when there is a low resistance to rotation of the output shaft, whereas the first resilient biasing member is configured to be compressed a relatively high amount when there is a high resistance to rotation of the output shaft.

The first resilient biasing member may comprise a spring.

However, it is contemplated that other forms of resilient biasing member may be used, such as materials that themselves inherently have resilient biasing properties (e.g. elastic properties), rather than being formed into a structure that is resiliently biasing.

The first resilient biasing member may be an elongated member that extends circumferentially around a rotational axis of the input shaft; or the first resilient biasing member may be an elongated member that extends circumferentially only part way around a rotational axis of the input shaft.

As described above, the assembly may be configured such that, in a high torque mode, when the input shaft is rotated in the first direction the first resilient biasing member is compressed by a relatively high amount such that the input shaft rotates relative to the output shaft, thereby moving an engagement member so as to disconnect the input shaft from the output shaft.

The first resilient biasing member enables the input shaft to rotate in the first direction relative to the output shaft in the high torque mode, i.e. when there is high resistance to rotation of the output shaft.

The second portion of the resilient biasing member may be coupled with the output shaft via the engagement member, in the low torque mode.

The first portion of the first resilient biasing member may be connected to the input shaft, wherein the second portion of the first resilient biasing member may be in contact with the engagement member, and wherein the engagement member may be movable between a first position in which it is connected with the output shaft for rotationally coupling the input shaft to the output shaft and a second position in which it is disconnected from the output shaft for rotationally decoupling the input shaft from the output shaft.

In the low torque mode, the first resilient biasing member may be compressed by said relatively low amount such that it exerts a relatively low force on the engagement member so as to drive rotation of the output shaft; and in the high torque mode, the first resilient biasing member may be compressed by said relatively high amount such that it exerts a force on the engagement member that moves it to said second position in which it is disconnected from the output shaft.

The engagement member may be movable between said first and second positions in a radial direction with respect to a rotational axis of the input shaft.

The first position may be radially inwards of the second position.

The first resilient biasing member may comprise a surface in contact with the engagement member that is at an acute or obtuse angle to the radial direction such that when the first biasing member is urged circumferentially in the first direction by the input shaft, it transmits a force to the engagement member having a component in the radial direction and a component in a circumferential direction.

The angle may be selected so as to determine the circumferential force (i.e. torque) that causes the engagement member to be moved radially to disengage the output shaft.

The output shaft may have a detent in its circumferential surface for receiving the engagement member when in the first position.

The assembly may comprise a further resilient biasing member arranged and configured to bias the engagement member into engagement with the output shaft in the low torque mode.

The further resilient biasing member may be a spring or other biasing material or member for urging the engagement member radially inwards.

Although the engagement member has been described as being moved radially outwards so as to disengage from the output shaft, it is alternatively contemplated that the engagement member may be moved radially inwards so as to disengage from the output shaft, i.e. such that the first position may be radially outwards of the second position. This may be achieved by angling the surface of the first resilient biasing member differently. In such an embodiment the further resilient biasing member may bias the engagement member radially outwards into engagement with the output shaft in the low torque mode.

The end of the input shaft may face an end of the output shaft, i.e. the input and output shafts may not be concentric.

The assembly may further comprise a second resilient biasing member having a first portion connected to the input shaft and a second portion in contact with the engagement member; wherein the assembly may be configured such that, in a low torque mode, when the input shaft is rotated in a second direction the second resilient biasing member is compressed by a relatively low amount and transmits a force from rotation of the input shaft to drive rotation of the output shaft; and wherein the assembly is configured such that, in a high torque mode, when the input shaft is rotated in the second direction the second resilient biasing member is compressed by a relatively high amount such that the input shaft rotates relative to the output shaft, thereby moving the engagement member so as to decouple the input shaft from the output shaft.

The second resilient biasing member may be arranged and configured to operate in the same manner as the first resilient biasing member except for when the input shaft is rotated in the second direction instead of the first direction.

As described above, the assembly may be configured such that, in a high torque mode, when the input shaft is rotated in the first direction the first resilient biasing member is compressed by a relatively high amount such that the input shaft rotates relative to the output shaft, thereby moving an engagement member so as to engage a housing to prevent or inhibit rotation of the input shaft relative to the housing.

The first resilient biasing member enables the input shaft to rotate in the first direction relative to the output shaft in the high torque mode, i.e. when there is high resistance to rotation of the output shaft.

The second portion of the resilient biasing member may be fixedly coupled to the output shaft such that it cannot move relative thereto.

The input shaft may contact the engagement member, wherein the input shaft may rotates in the first direction relative to the engagement member in the high torque mode, and wherein the engagement member and input shaft may be configured such that rotation of the input shaft relative to the engagement member in the first direction moves or urges the engagement member to engage the housing so as to prevent or inhibit rotation of the input shaft relative to the housing.

The input shaft may comprise a portion that is curved or otherwise ramped in a circumferential direction such that rotation of the input shaft relative to the engagement member in the first direction moves or urges the engagement member radially outwards.

The output shaft may be configured to prevent the engagement member moving in the first direction relative to the output shaft.

At least a portion of the output shaft may be arranged concentrically with, and between, at least a portion of the input shaft and at least a portion of the housing; wherein said portion of the output shaft may comprise an aperture in which the engagement member is arranged, and said aperture may be sized and configured to prevent the engagement member moving in the first direction relative to the output shaft.

The engagement member may be a roller.

The roller may rotate about its own axis in the low torque mode, as the input and output shafts rotate together relative to the housing. This reduces the friction in the system for the low torque mode. In the high torque mode, the roller is urged or moved against the housing by the input shaft with sufficient force to stop or inhibit the rotation of the input shaft. The friction between the roller and the housing in this mode may prevent the roller from rotating about its own axis.

Although only one engagement member for engaging the housing has been described, there may be a plurality of such engagement members and corresponding components for urging or moving them into contact with the housing when the input shaft rotates relative to the output shaft in the high torque mode.

The assembly may further comprise: a second resilient biasing member having a first portion connected to the input shaft and a second portion fixedly coupled to the output shaft such that it cannot move relative thereto; wherein the assembly may be configured such that, in a low torque mode, when the input shaft is rotated in a second direction the second resilient biasing member is compressed by a relatively low amount and transmits a force from rotation of the input shaft to drive rotation of the output shaft; and wherein the assembly may be configured such that, in a high torque mode, when the input shaft is rotated in the second direction the second resilient biasing member is compressed by a relatively high amount such that the input shaft rotates relative to the output shaft, thereby moving an engagement member so as to engage a housing to prevent or inhibit rotation of the input shaft relative to the housing.

The second resilient biasing member may be arranged and configured to operate in the same manner as the first resilient biasing member except for when the input shaft is rotated in the second direction instead of the first direction.

The present disclosure also provides a torque limiting assembly comprising: an input shaft; an output shaft; a movable engagement member biased to engage the output shaft; and a spring having a first portion coupled to the input shaft and a second portion coupled with the movable engagement member. The assembly is configured such that, in a low torque mode, rotation of the input shaft transmits a rotational force through the spring to the engagement member engaging the output shaft so as to drive rotation of the output shaft. The assembly is also configured such that, in a high torque mode, rotation of the input shaft forces the spring to move the engagement member so as to disengage it from the output shaft.

The assembly described herein may be used as part of high lift system or other torque transmitting systems. For example, the assembly may be used in an aircraft. For example, in the embodiments wherein the engagement member is urged into engagement with a housing, the housing may be an earth ring or a static part of an aircraft structure.

BRIEF DESCRIPTION OF THE DRAWINGS

Various embodiments will now be described, by way of example only, and with reference to the accompanying drawings in which:

FIG. 6E shows a sectional view along the length of the assembly.

DETAILED DESCRIPTION

Figure 1:
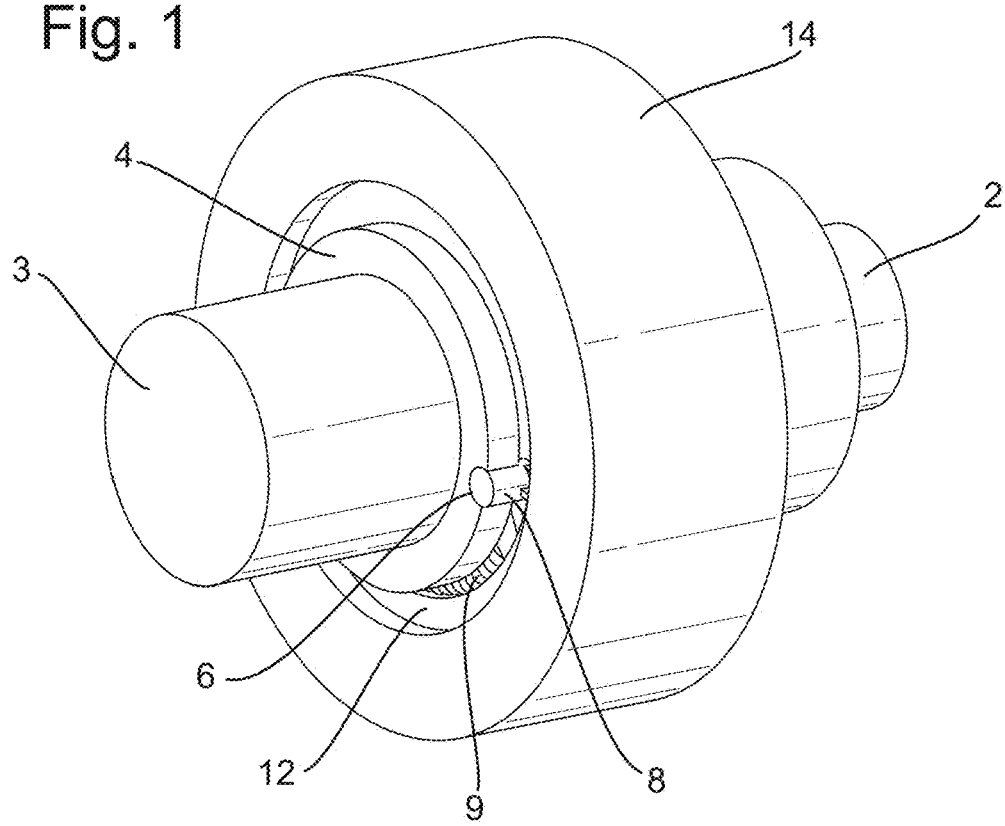
FIG. 1 shows a perspective view of a torque limiting assembly according to an embodiment of the present disclosure.

FIG. 1 shows a schematic of a torque limiting assembly according to an embodiment of the present disclosure in the form of an overload clutch assembly. The assembly is configured to disconnect the input shaft 2 from the output shaft 3 when the torque becomes excessively high.

The assembly comprises an input drive shaft 2, an output shaft 3 for being driven by the input drive shaft 2, and a clutch mechanism for engaging and disengaging the input shaft 2 and output shaft 3 so as to mechanically connect and disconnect them from each other. The ends of the input and output shafts 2,3 that face each other each have flanges 5,4. A detent 6 is located in the circumferential surface of the output shaft flange 4 for receiving an engagement member 8 of the clutch mechanism. The input shaft flange 5 is coupled to the engagement member 8 by first and second resilient biasing members 9,10, which in the illustrated embodiment are curved springs. The input shaft flange 5 is coupled to the engagement member 8 by the curved springs 9,10 such that in a first mode (low torque mode) the engagement member 8 is in a first position and engaged in the detent 6 on the output shaft flange 4, thereby mechanically coupling the input and output shafts 2,3 so that rotation of the input shaft 2 about its axis drives rotation of the output shaft 3 about its axis. The coupling between the input shaft flange 5 and the engagement member 8 by the curved springs 9,10 is also configured such that in a second mode (high torque mode) the engagement member 8 is urged to a second position and out of the detent 6 in the output shaft flange 4, thereby mechanically disconnecting and rotationally decoupling the input and output shafts 2,3 such that rotation of the input shaft 2 about its axis is not able to drive the output shaft 3 to rotate about its axis. These modes are described in more detail below. The assembly also comprises an inner housing 12 and an outer housing 14 for housing the clutch mechanism.

Figure 2A:
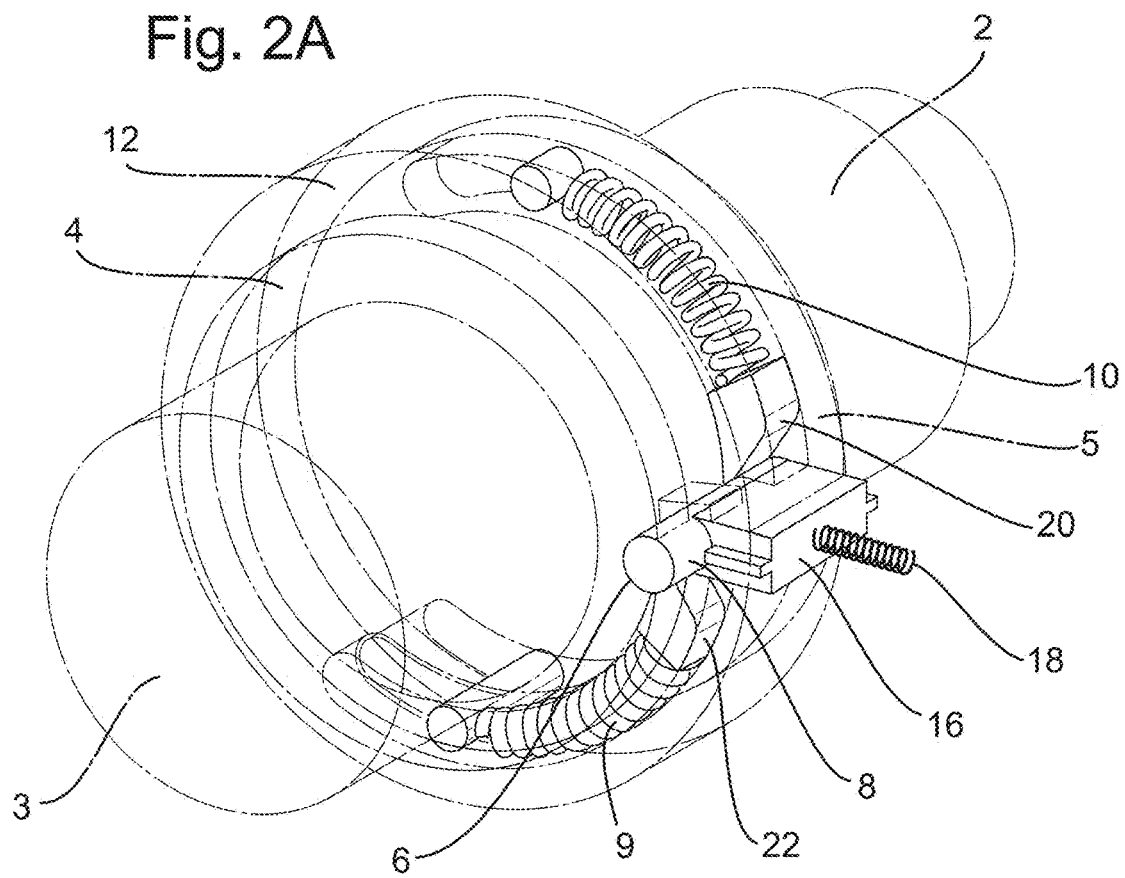
FIG. 2A shows the assembly of FIG. 1 except with the outer housing removed.

FIG. 2A shows the assembly of FIG. 1 except with the outer housing 14 removed so that the inner housing 12 and clutch mechanism can be seen in more detail. The inner housing 12 and output shaft 3 are illustrated as being translucent purely for illustrative purposes, so that components that would otherwise be hidden by them can be seen more easily.

As described in relation to FIG. 1, the ends of the input and output shafts 2,3 that face one another each have a radial flange 5,4 and the inner and outer housings 15,14 house the clutch mechanism. As can be seen in FIG. 2A, the engagement member 8 of the clutch mechanism is connected to a biasing block 16 that is connected to a resilient biasing member 18, which in the illustrated embodiment is in the form of a spring. The engagement member 8 is biased by the spring 18 so as to urge the engagement member 8 radially inwards towards the flange 4 of the output shaft 3. The engagement member 8 therefore tends to be biased into the detent 6 on the output shaft flange 4. Although not shown in FIG. 2A, the outer housing 14 has a pocket on its inner surface in which the biasing spring 18 and biasing block 16 are housed, thereby providing a fixed surface from which the spring 18 can urge the biasing block 16 and engagement member 8 radially inwards.

As described above, the clutch assembly comprises a first resilient biasing member in the form of a first curved spring 10 (e.g. an ARC spring) having a first end (first portion) attached to a wedge member 20 and a second opposite end (second portion) fixedly attached to the flange 5 of the input shaft 2. The first spring 10 is an elongated member that extends circumferentially only part way around a rotational axis of the input shaft 1. The wedge member 20 has a tapered surface in contact with a first side of the engagement member. The surface is at an acute or obtuse angle to the radial direction. When the input shaft 2 is rotated in a first direction, the first curved spring 10 resists compression and transmits the rotational force to the wedge member 20, which in turn transmits the rotational force to the engagement member 8. The bias spring 18 is resistant to compression and, under normal operating conditions (i.e. in the relatively low torque mode), prevents the wedge 20 from urging the engagement member 8 radially outwards. The bias spring 18 also prevents the engagement member 8 from leaving the detent 6 due to the centrifugal force exerted on it during rotation of the assembly. As such, as the input shaft 2 rotates in the first direction, the first curved spring 10 and wedge member 20 cause the engagement member 8 to rotate with it. As the engagement member 8 is also located in the detent 6 on flange 4 of the output shaft 3, the engagement member 8 transmits the rotational force to the output shaft 3 such that the output shaft 3 is driven to rotate by the input shaft 2.

As described above, the clutch assembly comprises a second resilient biasing member in the form of a second curved spring 9 (e.g. an ARC spring). The second spring 9 has a first end (first portion) attached to a second wedge member 22 and a second opposite end (second portion) fixedly attached to the flange 5 of the input shaft 2. The second spring 9 is an elongated member that extends circumferentially only part way around a rotational axis of the input shaft 1. The wedge member 22 has a tapered surface in contact with a second side of the engagement member 8, opposite to the first side of the engagement member 8. The surface is at an acute or obtuse angle to the radial direction. When the input shaft 2 is rotated in a second direction, the second curved spring 9 resists compression and transmits the rotational force to the second wedge member 22, which in turn transmits the rotational force to the engagement member 8. The bias spring 18 is resistant to compression and, under normal operating conditions (i.e. relatively low torque), prevents the second wedge 22 from urging the engagement member 8 radially outwards. As such, as the input shaft 2 rotates in the second direction, the second curved spring 9 and second wedge member 22 cause the engagement member 8 to rotate with it. As the engagement member 8 is also located in the detent 6 on flange 4 of the output shaft 3, the engagement member 8 transmits the rotational force to the output shaft 3 such that the output shaft 3 is driven to rotate by the input shaft 2.

Figure 2B:
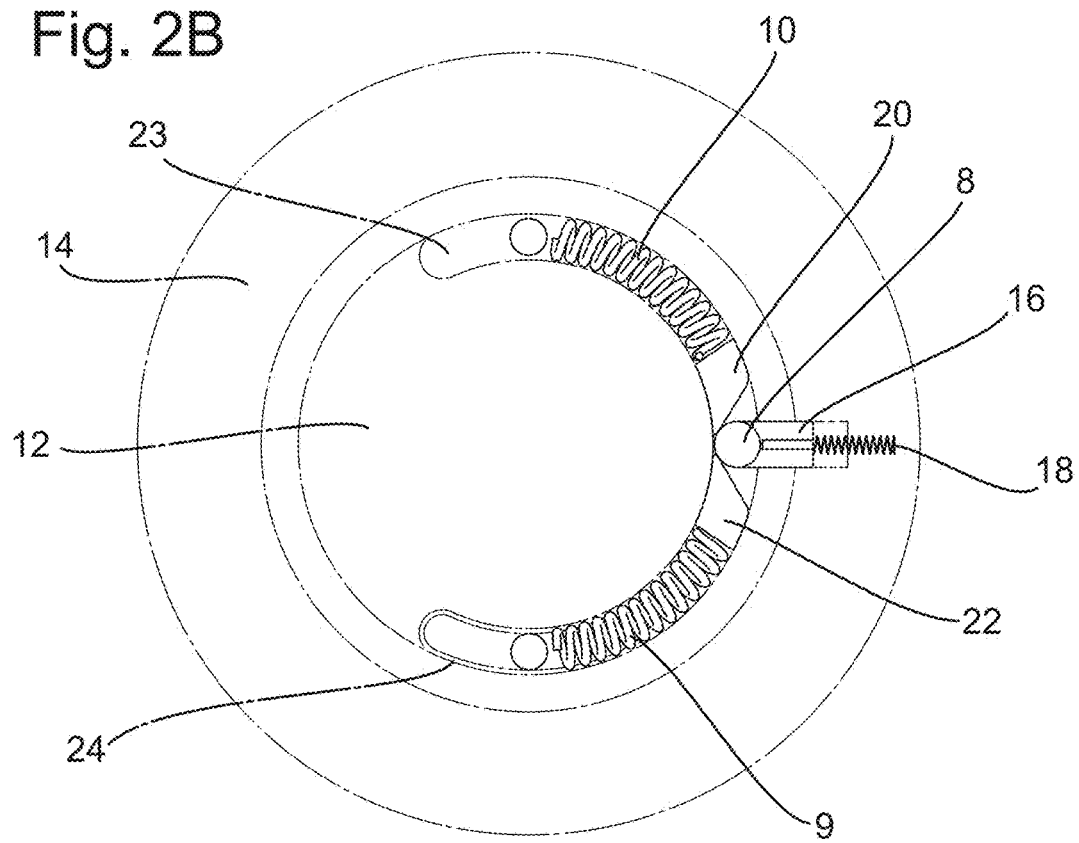
FIG. 2B shows a cross-sectional view of the assembly when in normal operation.

FIG. 2B shows a cross-sectional view of the assembly when in normal operation (i.e. under relatively low torque conditions), looking in a direction from the output shaft end towards the input shaft end. It can be seen that the first and second curved springs 10,9 are housed in respective curved slots 23,24 within the inner housing 12. In this normal (low torque) mode of operation, the biasing spring 18 and bias block 16 have urged the engagement member 8 radially inwards into the detent 6 in the flange 4 of the output shaft 3, such that the input and output shafts 2,3 are mechanically and rotationally coupled. As described in relation to FIG. 2A, rotation of the input shaft 2 in either the first or second direction therefore causes the output shaft 3 to rotate in a corresponding direction. In normal operation, the first and second springs 10,9 have a relatively low level of compression and transmit the rotational force from the input shaft 2 to the output shaft 3 via the engagement member 8.

Figure 3A:
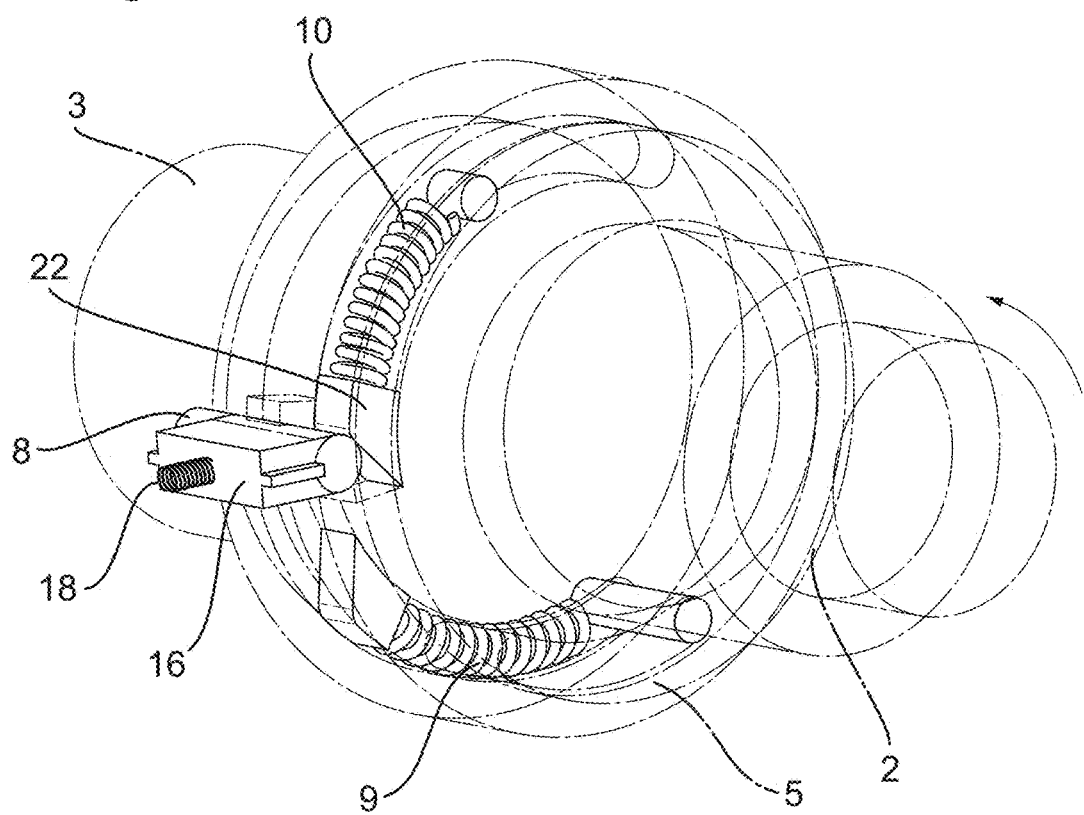
FIGS. 3A-3C show views of the assembly when the input shaft is being rotated in a first direction and when the torque in the system is relatively high.
Figure 3B:
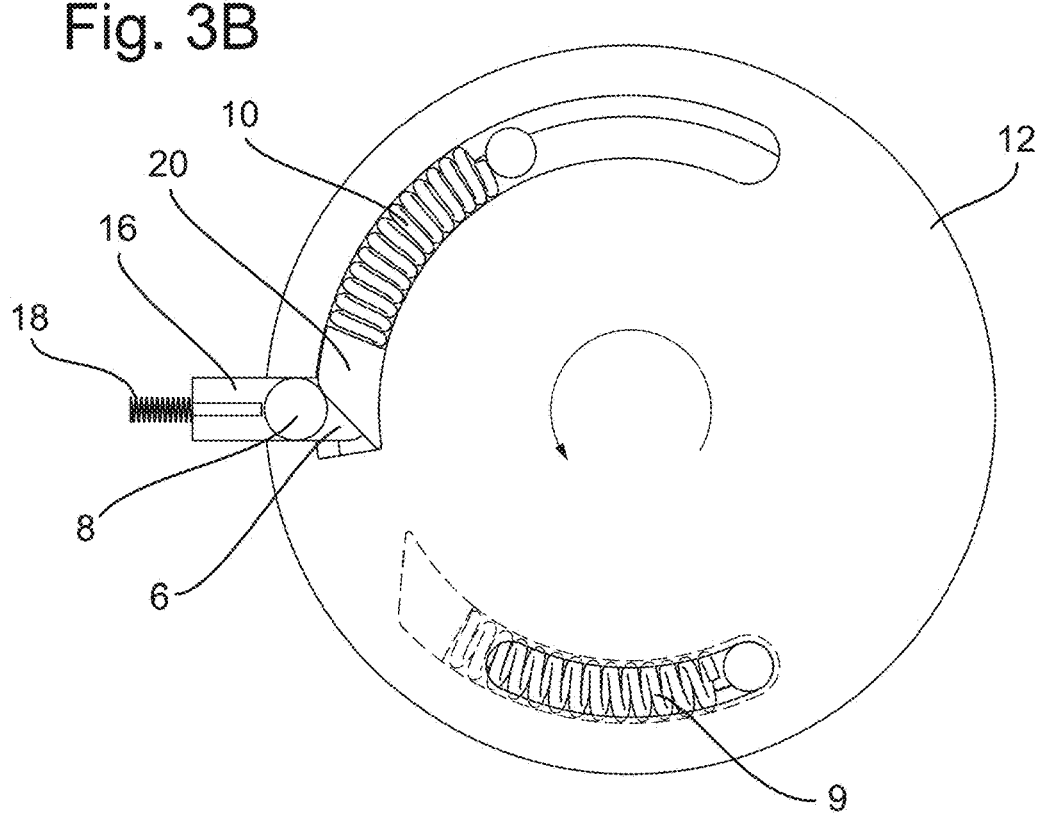
Figure 3C:
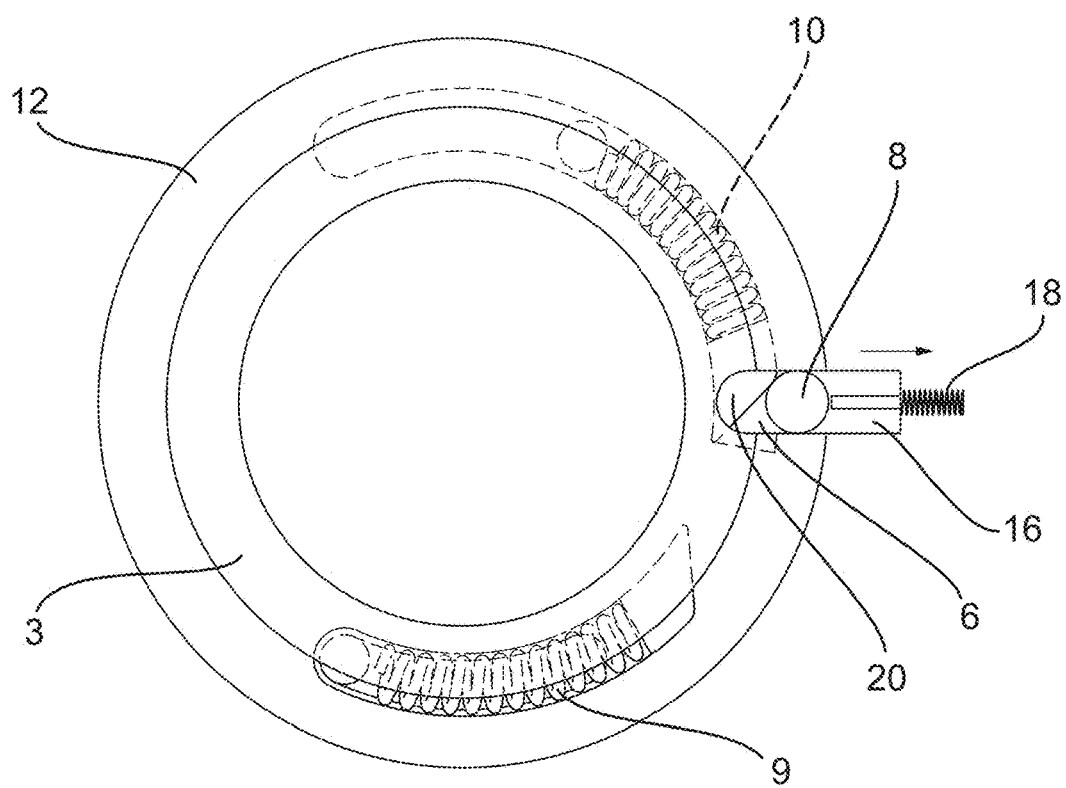

FIGS. 3A-3C show views of the assembly (with the outer housing 14 removed) when the input shaft 2 is being rotated in the first direction (shown by the arrow in FIGS. 3A-3B) and when the torque in the system is relatively high, i.e. above a threshold value. FIG. 3A shows a perspective view, FIG. 3B shows a cross-sectional view looking from the input shaft end towards the output shaft end, and FIG. 3C shows a cross-sectional view of the assembly looking from the output shaft end towards the input shaft end. As can be seen from FIGS. 3A-3C, when the torque in the system becomes high, e.g. due to relatively high resistance to rotation of the output shaft 3, the rotational force of the input shaft 2 compresses the first spring 10 to a relatively high level, allowing the input shaft 2 to rotate angularly relative to the output shaft 3. The compression of the first spring 10 increases the force exerted on the wedge member 20 in a direction towards the engagement member 8, as compared to under the normal operating conditions described above. The tapered surface of the wedge 20 member slides under the engagement member 8 and forces the engagement member 8 radially outwards, overcoming the force exerted by the bias spring 18. This drives the engagement member 8 out of the detent 6 in the flange of the output shaft 3 such that the input shaft 2 is no longer rotationally coupled to the output shaft 3. As such, rotation of the input shaft 2 in the first direction no longer drives rotation of the output shaft 3, thus protecting the assembly from being overloaded, which may result in damage. As the input shaft 2 is being rotated in the first direction and not the second direction, the second curved spring 9 remains relatively uncompressed as shown best in FIGS. 3B and 3C.

The threshold value of torque which causes the engagement member 8 to be moved out of the detent 6 is set by the level of compressibility of the first spring 10 (and/or optionally by the spring 18). It will be appreciated that levels of torque below the threshold value (caused by relatively low levels of resistance to rotation of the output shaft) will be absorbed by the first spring 10, with the spring 10 being compressed by a relatively low amount that is insufficient to cause the wedge member 20 to displace the engagement member 8 from the detent 6.

Figure 3D:
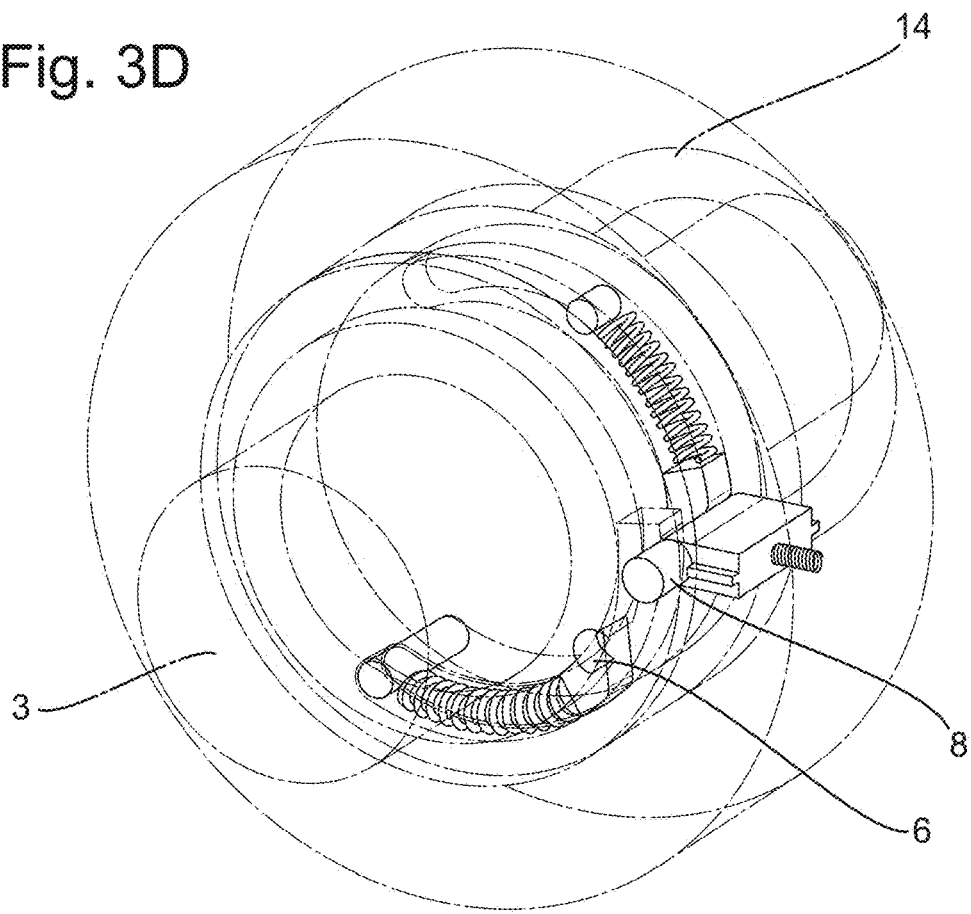
FIG. 3D shows the assembly when the input and output shafts are disengaged.

FIG. 3D shows the assembly (with the outer housing) when the engagement member 8 has been disengaged from the detent 6 in the output shaft 3 and the output shaft 3 has rotated so that the detent 6 and engagement member 8 are no longer aligned.

Figure 4A:
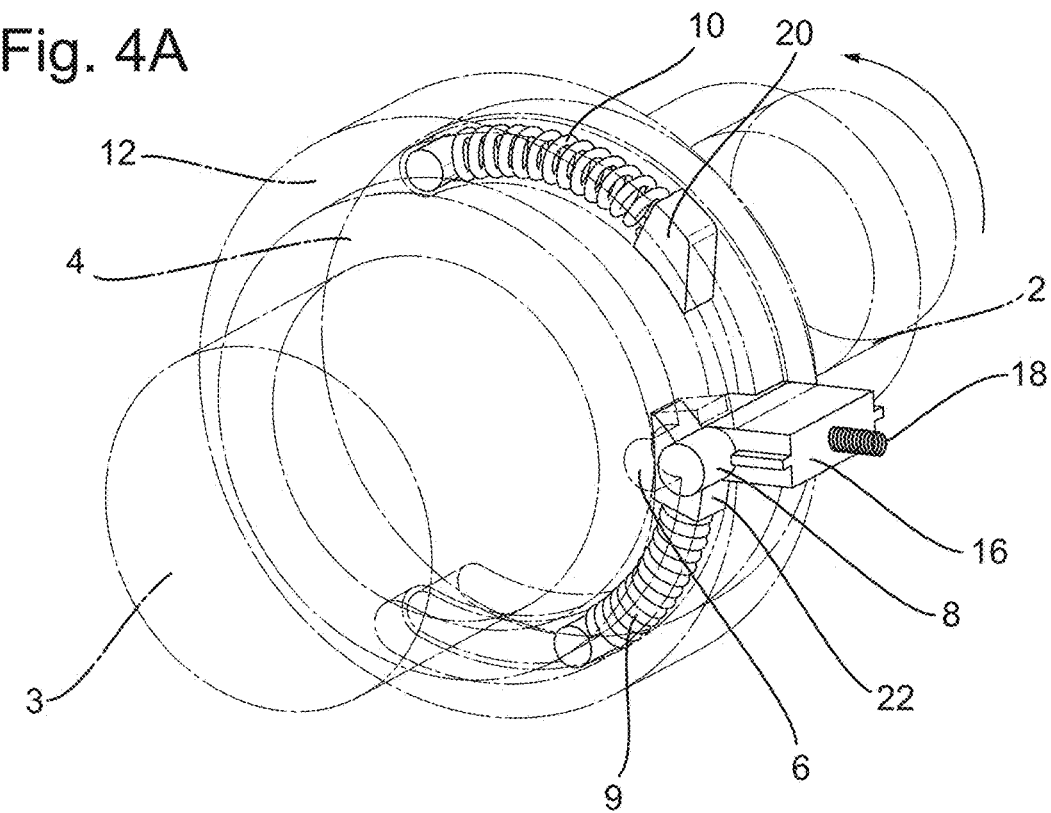
FIGS. 4A-4B show views of the assembly when the input shaft is being rotated in a second direction and when the torque in the system is relatively high.
Figure 4B:
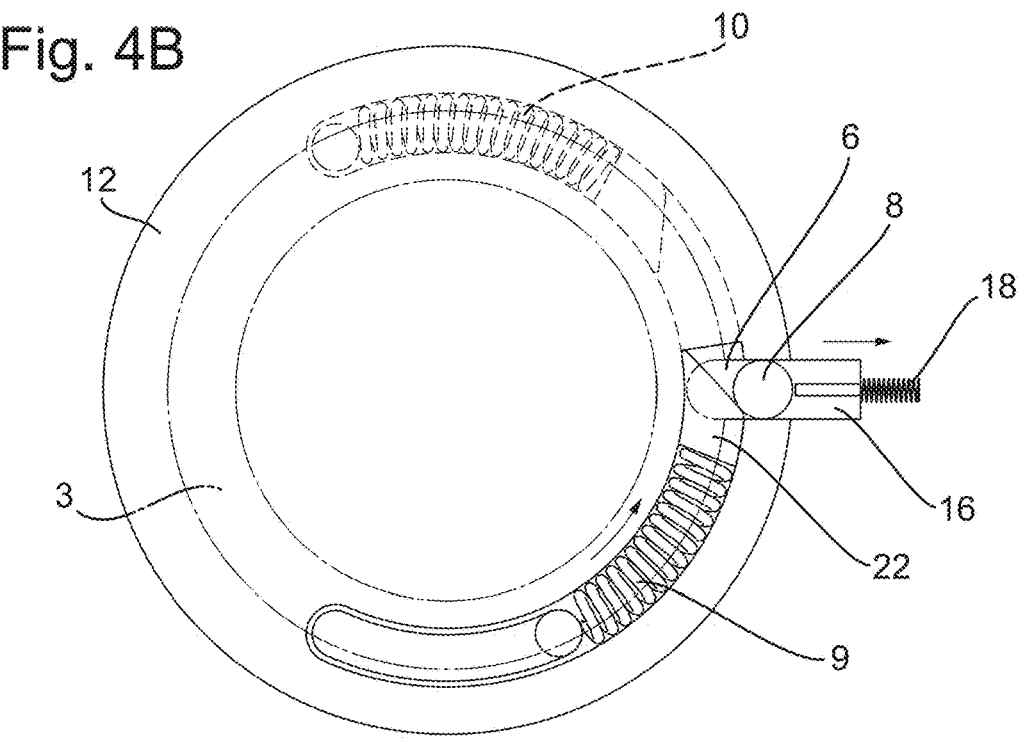

FIGS. 4A-4B show views of the assembly (with the outer housing 14 removed) when the input shaft 2 is being rotated in the second direction (shown by the arrow in FIG. 4A) and when the torque in the system is relatively high, i.e. above a threshold value. FIG. 4A shows a perspective view and FIG. 4B shows a cross-sectional view looking from the output shaft end towards the input shaft end. As can be seen from FIGS. 4A-4B, when the torque in the system becomes high, e.g. due to relatively high resistance to rotation of the output shaft 3, the rotational force of the input shaft 2 compresses the second spring 9 to a relatively high level, allowing the input shaft 2 to rotate angularly relative to the output shaft 3. The compression of the second spring 9 increases the force exerted on the second wedge member 22 in a direction towards the engagement member 8, as compared to under the normal operating conditions described above. The tapered surface of the second wedge 22 member slides under the engagement member 8 and forces the engagement member 8 radially outwards, overcoming the force exerted by the bias spring 18. This drives the engagement member 8 out of the detent 6 in the flange 4 of the output shaft 3 such that the input shaft 2 is no longer mechanically or rotationally coupled to the output shaft 3. As such, rotation of the input shaft 2 in the second direction no longer drives rotation of the output shaft 3, thus protecting the assembly from being overloaded, which may result in damage. As the input shaft 2 is being rotated in the second direction and not the first direction, the first curved spring 10 remains relatively uncompressed as shown best in FIG. 4A.

The threshold value of torque which causes the engagement member 8 to be moved out of the detent 6 is set by the level of compressibility of the second spring 9, optionally and/or the spring 18). It will be appreciated that levels of torque below the threshold value (caused by relatively low levels of resistance to rotation of the output shaft) will be absorbed by the second spring 9, with the spring 9 being compressed by a relatively low amount that is insufficient to cause the wedge member 22 to displace the engagement member 8 from the detent 6.

Figure 4C:
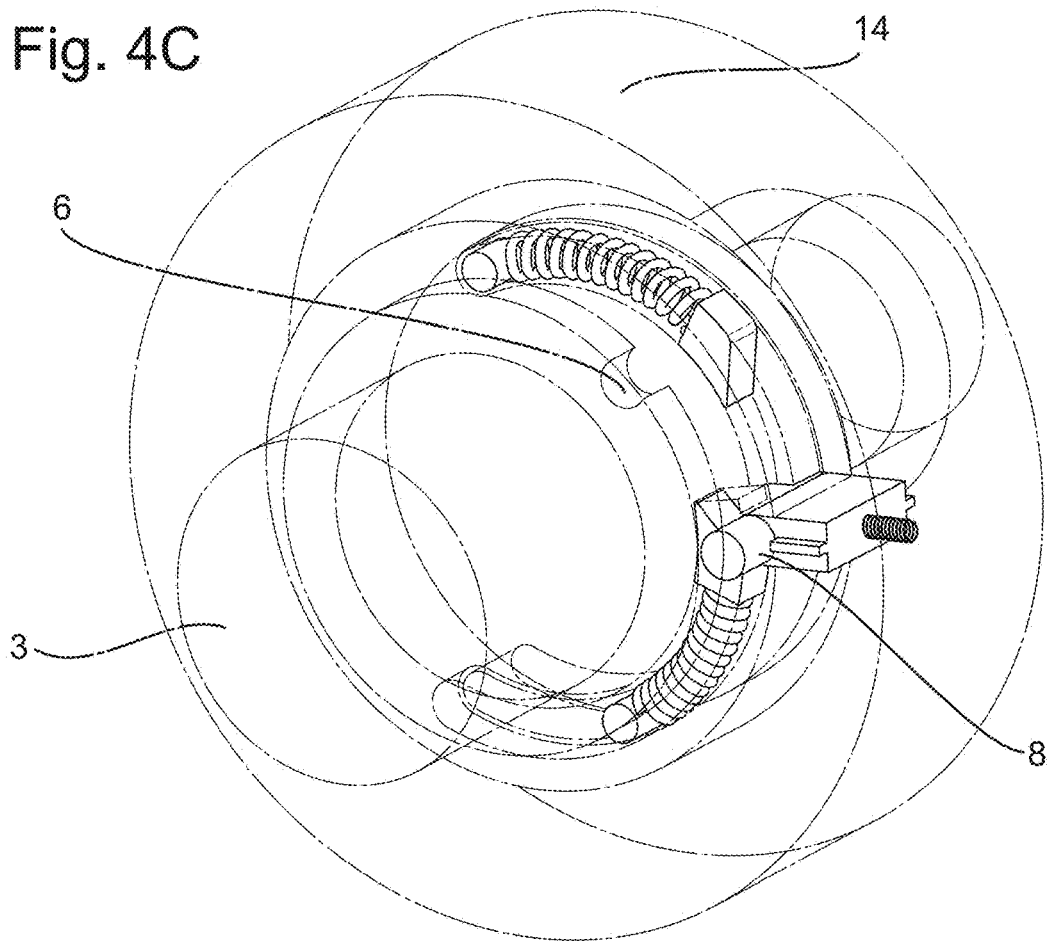
FIG. 4C shows the assembly when the input and output shafts are disengaged.

FIG. 4C shows the assembly when the engagement member 8 has been disengaged from the detent 6 in the output shaft 3 and the output shaft 3 has rotated so that the detent 6 and engagement member 8 are no longer aligned.

Figure 5A:
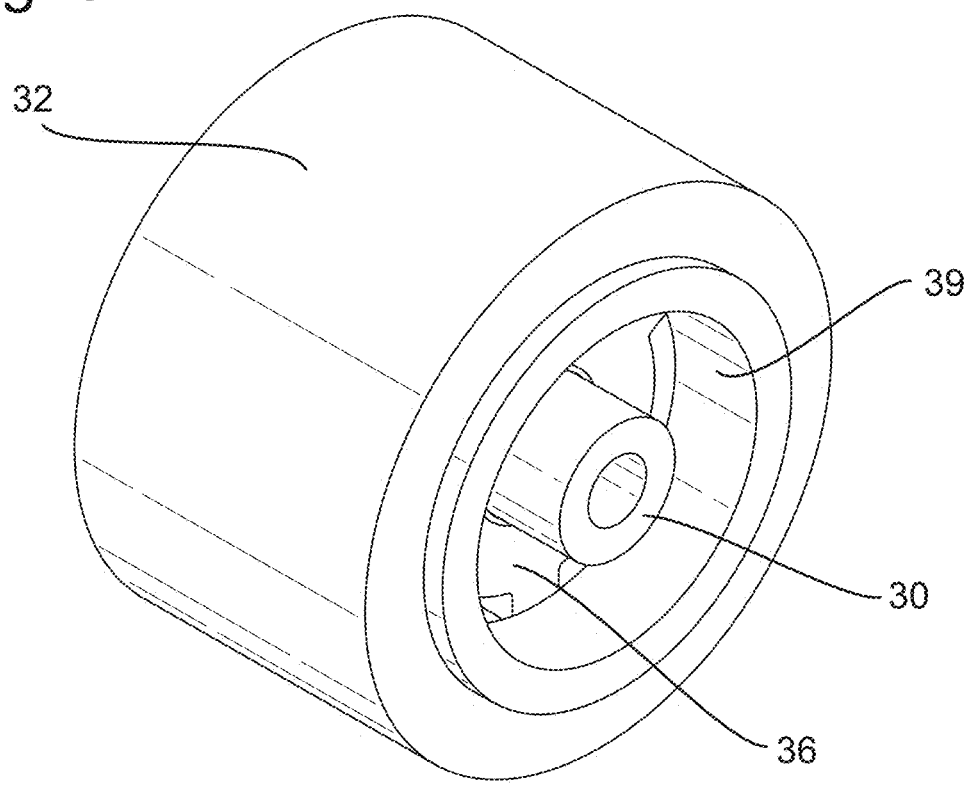
FIGS. 5A-5B show schematics of another embodiment of a torque limiting assembly.
Figure 5B:
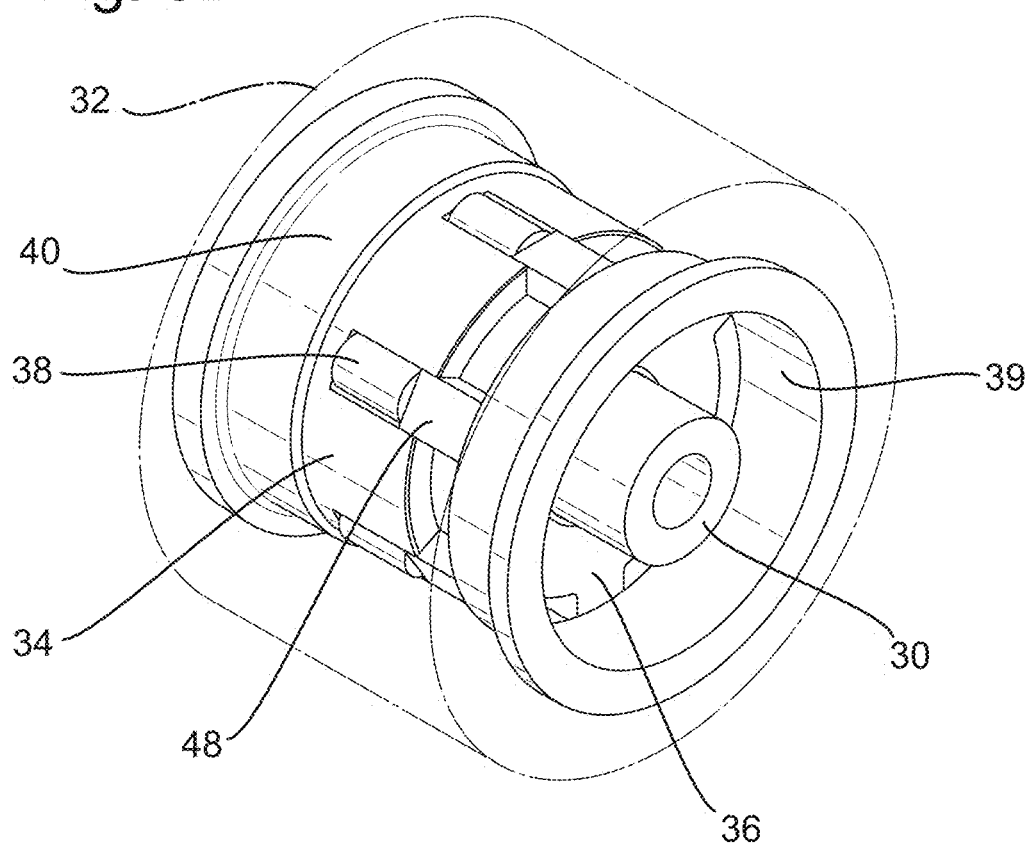

FIGS. 5A-5B show schematics of another embodiment of a torque limiting assembly. The assembly is configured to move or urge an engagement member so as to engage a housing to prevent or inhibit rotation of the input shaft 30 relative to the housing 32, when the torque becomes excessively high.

FIG. 5B corresponds to FIG. 5A, except that the outer housing 32 is illustrated as translucent, purely for illustrative purposes, so that the internal components may be seen more easily. The assembly comprises an outer housing 32 in the form of an earth ring, an input (drive) shaft 30, an output (driven) shaft 34, a spring carrier 36 and a plurality of engagement members 38 in the form of rollers, and first and second axial retainers 39,40 at the longitudinal ends of the assembly for retaining the above-described components therebetween. A portion of the output shaft 34 is arranged concentrically with, and between, a portion of the input shaft 30 and a portion of the housing 32.

Figure 6A:
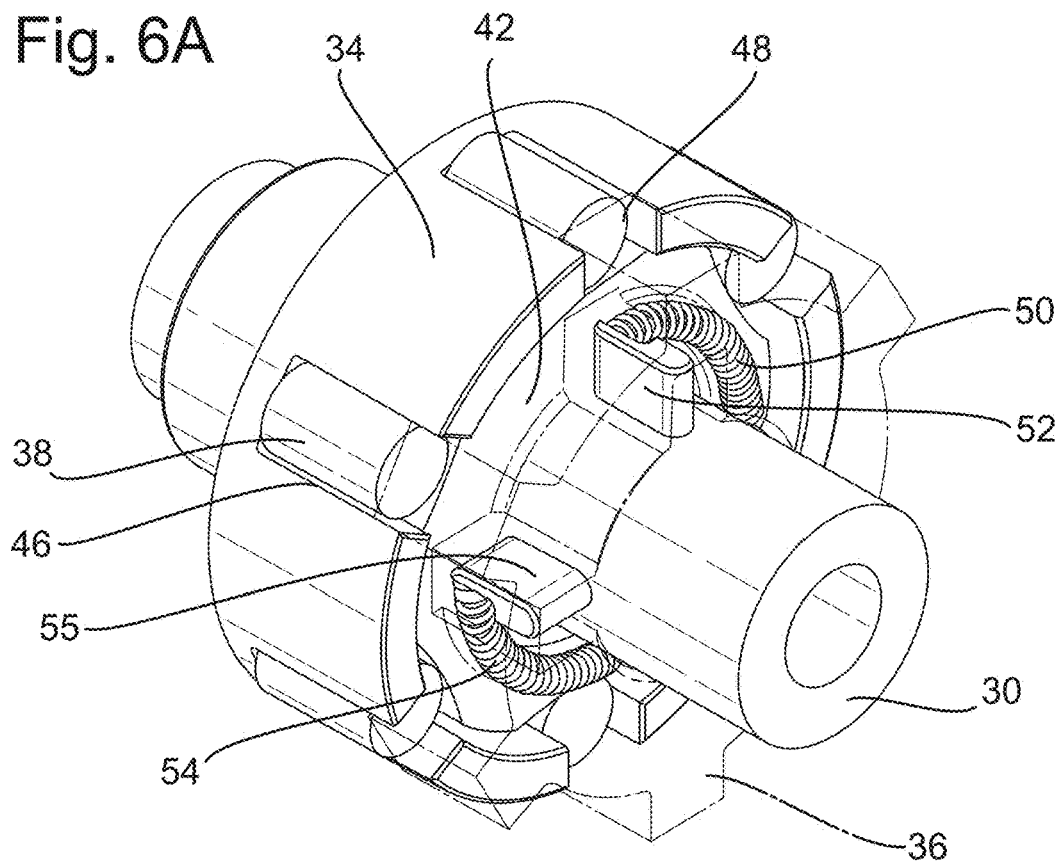
FIGS. 6A-6B show schematic perspective views of the assembly.
Figure 6B:
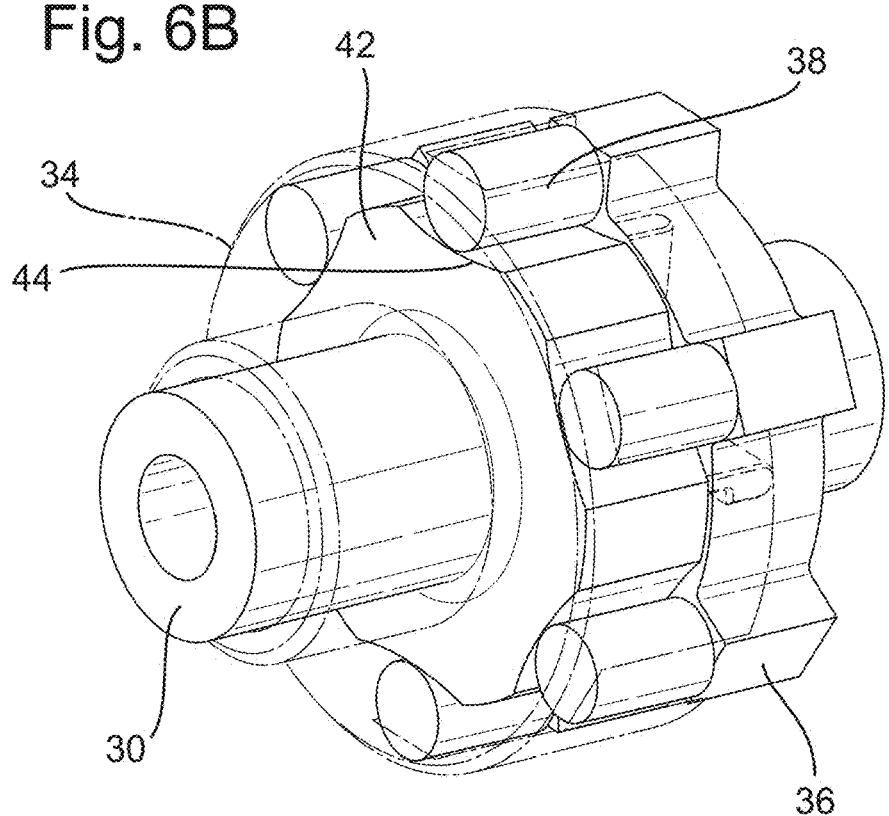

FIGS. 6A-6B show schematics of the assembly without the earth ring 32 and axial retainers 39,40 present, so that the other components can be seen more clearly. In FIG. 6A the spring carrier 36 is shown as being translucent, purely for illustrative purposes, so that other components may be seen more easily. FIG. 6B shows the assembly from another angle and with the output shaft 34 being translucent, purely for illustrative purposes, so that other components may be seen more easily.

As best seen from FIG. 6A, the input shaft 30 has a radially extending flange 42 housed within the output shaft 34. As best seen from FIG. 6B, the flange 42 comprises a plurality of curved ramps 44 (detents) spaced circumferentially around the flange 42 and the output shaft 34 comprises a corresponding plurality of apertures 46 therethrough that are arranged at locations radially outward of the curved ramps 44 on the input shaft 30. An engagement member 38, which in this embodiment is in the form of a cylindrical roller member, is located sitting in each of the curved ramps 44 and also within the corresponding aperture 46 in the output shaft 34.

Figure 6C:
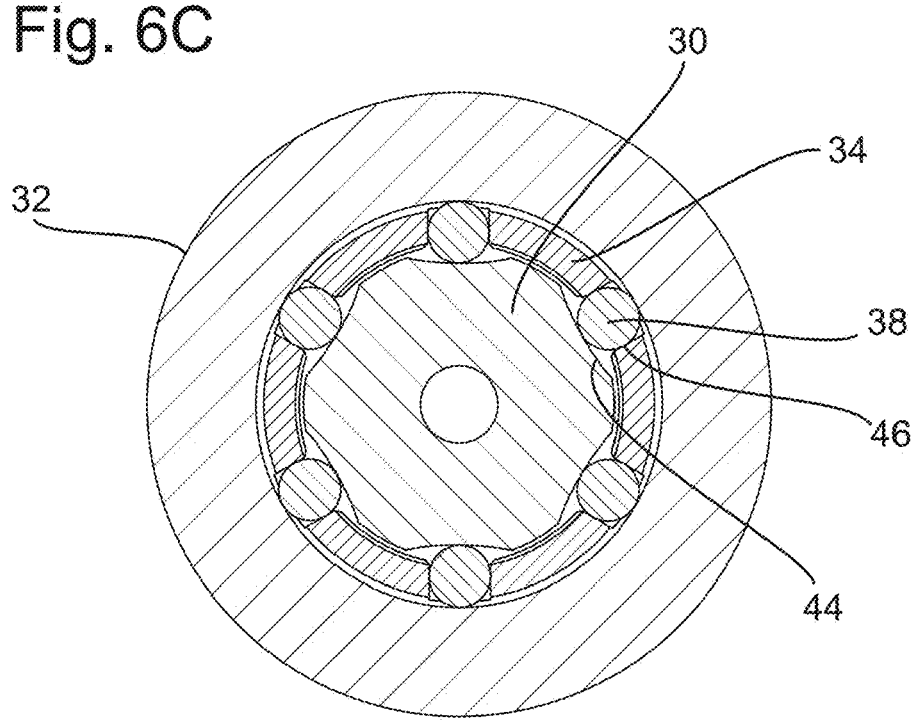
FIGS. 6C-6D show cross-sectional views through the assembly.

FIG. 6C shows a cross-sectional view through the assembly at the position where the rollers 38 are located. It is to be noted that the earth ring 32 is shown in FIG. 6C.

Figure 6D:
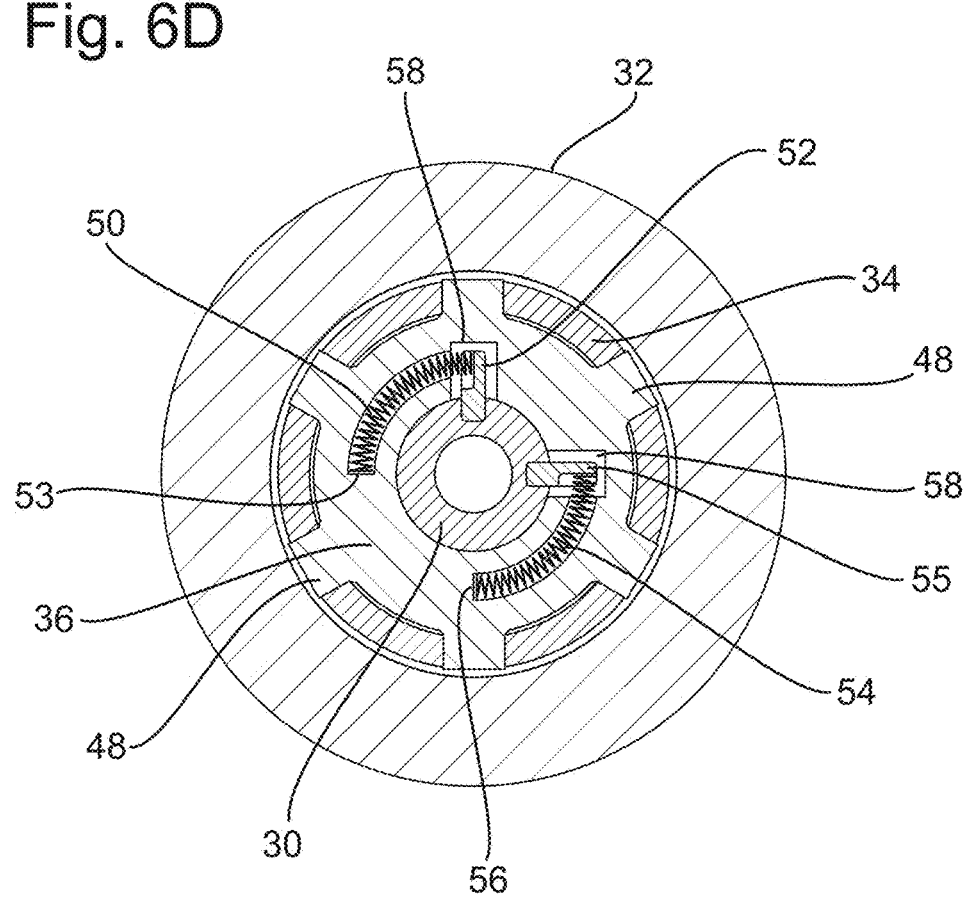

FIG. 6D shows a cross-sectional view through the assembly at the position where the spring carrier 36 is located. It is to be noted that the earth ring 32 is shown in FIG. 6D. This Figure best illustrates the coupling between the input shaft 30 and spring carrier 36, and the coupling between the spring carrier 36 and the output shaft 34. The input shaft 30 is therefore coupled to the output shaft 34.

It can be seen that the spring carrier 36 is rotationally fixed relative to the output shaft 34 so that the two rotate together (in normal operation, i.e. at low torque). For example, the spring carrier 36 may have protrusions 48 that interlock with the apertures 46 in the output shaft 34 (e.g. the ones in which the rollers 38 are located) so as to rotationally interlock the spring carrier 36 and output shaft 34. The spring carrier 36 is coupled to the input shaft 30 so that the input shaft 30 may rotate to some extent relative to it. A first resilient biasing member 50, in the form of a first curved spring in the illustrated embodiment, is fixedly attached at one of its ends (at a first portion) to the spring carrier 36 and is fixedly attached at the other end (second portion) to the input shaft 30, via a first radial protrusion 52 on the input shaft 30, so as to resist rotation of the input shaft 30 relative to the spring carrier 36 in a first angular direction. The first spring 50 extends only partially around the circumference of the input shaft 30 in a first direction from the first radial protrusion 52 to the fixation point 53 on the spring carrier 36. A second resilient biasing member 54, in the form of a second curved spring in the illustrated embodiment, may be provided that is fixedly attached at one of its ends (at a first portion) to the spring carrier 36 and is fixedly attached at the other end (second portion) to the input shaft 30, via a radial protrusion 55 on the input shaft 30, so as to resist rotation of the input shaft 30 relative to the spring carrier 36 in a second angular direction. The second spring 54 extends only partially around the circumference of the input shaft 30 in a second direction from the radial protrusion 55 to its fixation point 56 on the spring carrier 36. The radial protrusions 52,55 on the input shaft 30 may be located in recesses 58 in the interior surface of the spring carrier 36, wherein the recesses 58 and protrusions 52,55 are sized and configured so that the input shaft 30 may only rotate relative to the spring carrier 36 until the protrusions 52,55 hit the side walls of the recesses 58 and are prevented from rotating further.

FIG. 6E shows a sectional view along the length of the assembly.

The operation of the assembly will now be described with reference to FIGS. 6A-6E. In operation the input shaft 30 may be rotated about its longitudinal axis in a first direction. The first spring 50 is resistant to compression and so under normal operating conditions (i.e. under relatively low torque conditions) the first spring 50 has a relatively low level of compression. The rotational force from the input shaft 30 is therefore transmitted to the spring carrier 36 without significant angular rotation of the input shaft 30 relative to the spring carrier 36. The rotational force from the spring carrier 36 is then transmitted to the output shaft 34 so as to rotate the output shaft 36. As there is no significant angular rotation between the input shaft 30 and the spring carrier 36, there is also no significant angular rotation between the input shaft 30 and the output shaft 34. As such, the well of each curved ramp 44 on the input shaft 30 remains substantially centrally aligned with its respective aperture 46 in the output shaft 34 such that the respective roller 38 is not urged outwardly by the ramp 44 of the input shaft 30. This position is best seen in FIGS. 6B and 6C. The rollers 38 are therefore not forced against the earth ring 32 by the input shaft 30 and so rotation of the input shaft 30 drives rotation of the spring carrier 36 and rotation of the output shaft 34.

However, if the torque in the system becomes high and increases to a threshold level, e.g. due to relatively high resistance to rotation of the output shaft 34, the rotational force of the input shaft 30 compresses the first spring 50 to a relatively high level, allowing the input shaft 30 to rotate angularly relative to the spring carrier 36 and hence relative to the output shaft 34. As such, the well of each curved ramp 44 on the input shaft 30 rotates relative to its respective aperture 46 in the output shaft 34 and relative to its respective roller 38, thus forcing the rollers 38 radially outwards and into contact with the interior surface of the earth ring 32. The rollers 38 may be urged onto the earth ring 32 by the ramps 44 with such force that the friction between the rollers 38 and the earth ring 32 inhibit or prevent the circumferential movement of the rollers 38 relative to the earth ring 32 and hence inhibit or prevent rotation of the input shaft 30. As such, the torque at the output shaft 34 will be reduced or eliminated.

The threshold value of torque which causes the input shaft 30 to rotate relative to the output shaft 34 so as to urge the rollers 38 into contact with the earth ring 32 is set by the level of compressibility of the first spring 50. It will be appreciated that levels of torque below the threshold value (caused by relatively low levels of resistance to rotation of the output shaft 34) will be absorbed by the first spring 50, with the spring 50 being compressed by a relatively low amount that is insufficient to cause the input shaft 30 to rotate relative to the output shaft 34 by an amount that causes the rollers 38 to be urged into contact with the earth ring 32.

Although a frictional engagement has been described, it is alternatively contemplated that the internal surface of the earth ring 32 may comprise recessed pockets (or other circumferential barriers) configured such that when the rollers 38 are forced radially outwards by the ramps 44 the rollers 38 engage the pockets (or other barriers) and are unable to move circumferentially relative to the earth ring 32. This prevents the input shaft 30 from rotating and hence reduces or eliminates the torque at the output shaft 34.

The input shaft 30 has been described as being rotated about its longitudinal axis in a first direction, but it may alternatively be rotated about its longitudinal axis in a second direction. The second spring 54 is resistant to compression and so under normal operating conditions (i.e. under relatively low torque conditions) the second spring 50 has a relatively low level of compression. The rotational force from the input shaft 30 is therefore transmitted to the spring carrier 36 without significant angular rotation of the input shaft 30 relative to the spring carrier 36. The rotational force from the spring carrier 36 is then transmitted to the output shaft 34 so as to rotate the output shaft 34. As there is no significant angular rotation between the input shaft 30 and the spring carrier 36, there is also no significant angular rotation between the input shaft 30 and the output shaft 34. As such, the well of each curved ramp 44 on the input shaft 30 remains substantially centrally aligned with its respective aperture 46 in the output shaft 34 such that the respective roller 38 is not urged outwardly by the ramp 44 of the input shaft 30. The rollers 38 are therefore not forced against the earth ring 32 by the input shaft 30 and so the input shaft 30 is free to drive the output shaft 34.

On the other hand, if the torque in the system becomes high and increases to a threshold level, e.g. due to relatively high resistance to rotation of the output shaft 34, the rotational force of the input shaft 30 compresses the second spring 54 to a relatively high level, allowing the input shaft 30 to rotate angularly relative to the spring carrier 36 and hence relative to the output shaft 34. As such, the well of each curved ramp 44 on the input shaft 30 rotates relative to its respective aperture 46 in the output shaft 34, thus forcing the rollers 38 radially outwards and into contact with the interior surface of the earth ring 32. As described above, this results in the rotation or the input shaft 30 being slowed or prevented and a reduction or elimination of the torque.

The threshold value of torque which causes the input shaft 30 to rotate relative to the output shaft 34 so as to urge the rollers 38 into contact with the earth ring 32 is set by the level of compressibility of the second spring 54. It will be appreciated that levels of torque below the threshold value (caused by relatively low levels of resistance to rotation of the output shaft 34) will be absorbed by the second spring 54, with the spring 54 being compressed by a relatively low amount that is insufficient to cause the input shaft 30 to rotate relative to the output shaft 34 by an amount that caused the rollers 38 to be urged into contact with the earth ring 32.

Although the present disclosure has been described with reference to various embodiments, it will be understood by those skilled in the art that various changes in form and detail may be made without departing from the scope of the invention as set forth in the accompanying claims.

The invention claimed is:

1. A torque limiting assembly comprising:
    an input shaft;
    an output shaft; and
    a first resilient biasing member having a first portion connected to the input shaft and a second portion coupled to the output shaft, wherein the second portion of the first resilient biasing member is attached to a wedge member, wherein the wedge member is in contact with an engagement member, and wherein the engagement member is movable between a first position in which it is connected with the output shaft for rotationally coupling the input shaft to the output shaft and a second position in which it is disconnected from the output shaft for rotationally decoupling the input shaft from the output shaft;
    wherein the assembly is configured such that, in a low torque mode, when the input shaft is rotated in a first direction the first resilient biasing member is compressed by a relatively low amount and transmits a force from rotation of the input shaft to drive rotation of the output shaft;
    wherein the assembly is configured such that, in a high torque mode, when the input shaft is rotated in the first direction the first resilient biasing member is compressed by a relatively high amount such that the input shaft rotates relative to the output shaft, thereby moving or urging the engagement member so as to disconnect the input shaft from the output shaft; and
    wherein the assembly comprises a further resilient biasing member arranged and configured to bias the engagement member into engagement with the output shaft in the low torque mode.

2. The assembly of claim 1, wherein the first resilient biasing member comprises a spring.

3. The assembly of claim 1, wherein the first resilient biasing member is an elongated member that extends circumferentially only part way around a rotational axis of the input shaft.

4. The assembly of claim 1, wherein in the low torque mode, the first resilient biasing member is compressed by said relatively low amount such that it exerts a relatively low force on the engagement member so as to drive rotation of the output shaft; and wherein in the high torque mode, the first resilient biasing member is compressed by said relatively high amount such that it exerts a force on the engagement member that moves it to said second position in which it is disconnected from the output shaft.

5. The assembly of claim 1, wherein the engagement member is movable between said first and second positions in a radial direction with respect to a rotational axis of the input shaft.

6. The assembly of claim 5, wherein the wedge member comprises a surface in contact with the engagement member that is at an acute or obtuse angle to the radial direction such that when the first biasing member is urged circumferentially in the first direction by the input shaft, it transmits a force to the engagement member having a component in the radial direction and a component in a circumferential direction.

7. The assembly of claim 5, wherein the output shaft has a detent in its circumferential surface for receiving the engagement member when in the first position.

8. A torque limiting assembly comprising:
    an input shaft;
    an output shaft; and
    a first resilient biasing member having a first portion connected to the input shaft and a second portion coupled to the output shaft, wherein the second portion of the first resilient biasing member is attached to a wedge member, wherein the wedge member is in contact with an engagement member, and wherein the engagement member is movable between a first position in which it is connected with the output shaft for rotationally coupling the input shaft to the output shaft and a second position in which it is disconnected from the output shaft for rotationally decoupling the input shaft from the output shaft;

wherein the assembly is configured such that, in a low torque mode, when the input shaft is rotated in a first direction the first resilient biasing member is compressed by a relatively low amount and transmits a force from rotation of the input shaft to drive rotation of the output shaft;

wherein the assembly is configured such that, in a high torque mode, when the input shaft is rotated in the first direction the first resilient biasing member is compressed by a relatively higher amount such that the input shaft rotates relative to the output shaft, thereby moving or urging the engagement member so as to disconnect the input shaft from the output shaft; and wherein the assembly further comprises:

a second resilient biasing member having a first portion connected to the input shaft and a second portion is coupled to the engagement member;

wherein the assembly is configured such that, in a low torque mode, when the input shaft is rotated in a second direction the second resilient biasing member is compressed by a relatively low amount and transmits a force from rotation of the input shaft to drive rotation of the output shaft; and wherein the assembly is configured such that, in a high torque mode, when the input shaft is rotated in the second direction the second resilient biasing member is compressed by a relatively higher amount such that the input shaft rotates relative to the output shaft, thereby moving the engagement member so as to decouple the input shaft from the output shaft.

9. The assembly of claim 1, wherein the second portion of the first resilient biasing member is fixedly coupled to the output shaft such that it cannot move relative thereto.

10. A torque limiting assembly comprising:
an input shaft;
an output shaft;
a movable engagement member biased to engage the output shaft;
an elongated spring having a longitudinal axis that circumferentially extends part way around a rotational axis of the input shaft, the spring having a first end coupled to the input shaft and a second end coupled to the movable engagement member;
wherein the assembly is configured such that, in a low torque mode, rotation of the input shaft compresses the spring along its longitudinal axis by a relatively low amounts so as to thereby transmit a rotational force through the spring to the engagement member engaging the output shaft so as to drive rotation of the output shaft; and
wherein the assembly is configured such that, in a high torque mode, rotation of the input shaft compresses the spring along its longitudinal axis by a relatively higher amount and causes the spring to move the engagement member so as to disengage the engagement member from the output shaft.

* * * * *